Figure 1:
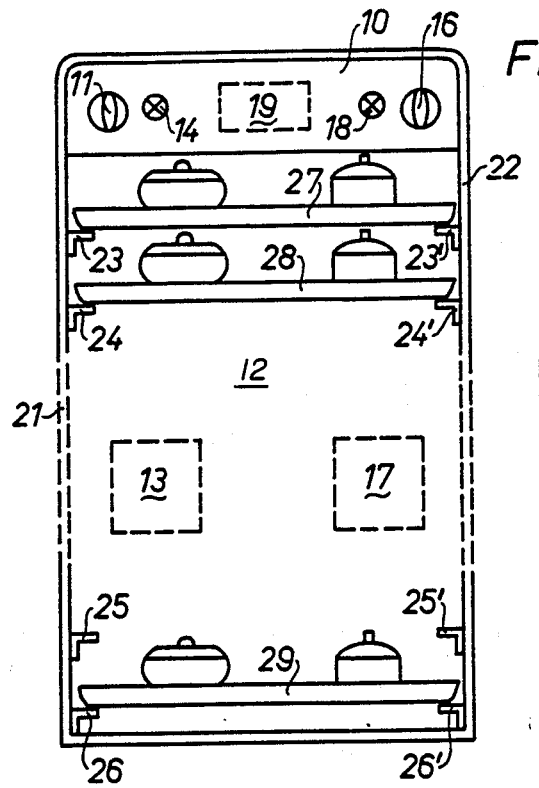

United States Patent [19]

Meier

[11] Patent Number: 4,881,590
[45] Date of Patent: Nov. 21, 1989

[54] APPARATUS FOR COOLING, STORING AND INDUCTIVELY REHEATING COMPLETE MEALS

[75] Inventor: Hermann Meier, Horw, Switzerland

[73] Assignee: Berndorf Luzern AG, Luzern, Switzerland

[21] Appl. No.: 169,483

[22] Filed: Mar. 17, 1988

[30] Foreign Application Priority Data

Mar. 30, 1987 [CH] Switzerland ................. 01210/87

[51] Int. Cl.$^4$ ............................................. F25B 29/00
[52] U.S. Cl. ...................................... 165/48.1; 165/61; 165/64; 165/918; 219/10.491; 219/10.67; 219/10.77; 126/390
[58] Field of Search ............... 165/48.1, 61, 63, 64, 165/918, 919; 219/10.491, 10.67, 10.75, 10.77; 126/390

[56] References Cited

U.S. PATENT DOCUMENTS

| | | | |
|---|---|---|---|
| 3,684,853 | 8/1972 | Welsh et al. | 219/10.67 |
| 3,786,220 | 1/1974 | Harnden, Jr. | 219/10.75 |
| 3,836,744 | 9/1974 | Takedo et al. | 219/10.491 |
| 3,965,969 | 6/1976 | Williamson | 165/919 |
| 4,005,745 | 2/1977 | Colato et al. | 165/30 |
| 4,020,310 | 4/1977 | Souder, Jr. et al. | 165/919 |
| 4,110,588 | 8/1979 | Holz | 219/10.491 |
| 4,346,756 | 8/1982 | Dodd et al. | 165/919 |
| 4,705,727 | 11/1987 | Hunter | 126/390 |
| 4,776,386 | 10/1988 | Meier | 165/48.1 |

FOREIGN PATENT DOCUMENTS

0203883 4/1986 European Pat. Off. .

Primary Examiner—John Ford
Attorney, Agent, or Firm—Morris Fidelman; Franklin D. Wolffe

[57] ABSTRACT

The apparatus consists of a refrigerator (10) into which it is possible to insert trays (27, 28, 29) on which various tableware containing different foods and/or drinks are placed. The refrigerator contains, in addition to the cooling unit (13), a high-frequency generator (17) which interacts with induction coils which are arranged in the trays, making it possible to heat suitable tableware inductively. Furthermore, a temperature monitoring means (19) is provided which switches the high-frequency generator off or on during a settable heating time and on reaching a predetermined temperature. A preferred embodiment of the temperature monitoring means contains an induction coil (41), which corresponds to the coils in the trays, and a metal element (42), the heat capacity of which approximately corresponds to that of a piece of tableware. The metal element is connected to the refrigerator housing by a heat-conducting connection (43, 44, 46). The heat conduction corresponds approximately to the heat absorption of the food in the tableware. A temperature sensor (47) which switches the high-frequency generator off or on at the settable temperature is arranged on the metal element. The apparatus makes it possible for several portions of food to be prepared, stored under cool conditions and heated uniformly to a predetermined temperature at a predetermined time.

4 Claims, 2 Drawing Sheets

APPARATUS FOR COOLING, STORING AND INDUCTIVELY REHEATING COMPLETE MEALS

The present invention relates to an apparatus for cooling, storing and reheating complete meals, which are prepared so that they are ready to eat, introduced in portions into appropriate tableware for eating and/or drinking and arranged on a tray, comprising a refrigerator which, in addition to the cooling unit, is equipped with a generator for inductively transmittable electrical energy, and trays, each of which has at least one induction coil which is connected to the generator when the tray is placed in the refrigerator, and tableware components which have a metal layer at least on the outer surface of the base, the said metal layer being suitable for inductive heating.

Apparatuses of the type described are known and commonly used and are described in, for example, German Offenlegungsschrift 2,326,633 and European Offenlegungsschrift 0,203,883. Such apparatuses are used in particular in factory canteens, where many portions of food are prepared by a relatively small staff and stored on trays under refrigeration so that they are simultaneously available for consumption, or in hospitals, where the portions of food are served at different times of the day in different places.

When solid foods are heated in tableware for eating, care must be taken to ensure that the temperature of the tableware remains below a value at which the food adheres to the tableware, and that heat is supplied until the parts of the food which are not adjacent to the tableware have also reached the desired temperature. To satisfy these two conditions, the power of the generator, the inductance of the induction coils and the metal layer on the tableware components are matched to one another in such a way that, when the largest possible number of fully occupied trays is inserted, the solid foods reach their core temperature after about 35 minutes, and drinks reach the correct drinking temperature in the same time, without, for example, milk forming a layer adjacent to the bottom of the tableware.

This matching of the various electrical assemblies and tableware components with one another has the disadvantage that, when only some of the trays or only partially filled trays are inserted, the tableware components are supplied with too much energy, so that the food is overheated, with the undesired consequences already mentioned.

It is therefore the object of the present invention to provide an apparatus which permits food and/or drinks to be heated to a predetermined eating or drinking temperature within a time required to reach the core temperature of solid food but without overheating the tableware component and/or that part of the food adjacent to the tableware, even when only the induction coils of some of a total number of trays which can be inserted into the refrigerator are connected to the generator or the trays are only partly occupied by tableware.

According to the invention, this object is achieved by an apparatus of the type described at the outset which has a temperature monitoring means which switches the generator off or on during the heating time if the temperature of the tableware in the region of the metal layer increases above or falls below, respectively, the predetermined temperature.

In a preferred embodiment of the apparatus, tableware having the same shape and the same dimensions is used for milk and coffee water or tea water, the said tableware having different metal layers on the base surface, for heating the contents to different extents.

The invention is described below with reference to a preferred embodiment and to the Figures.

Figure 2:
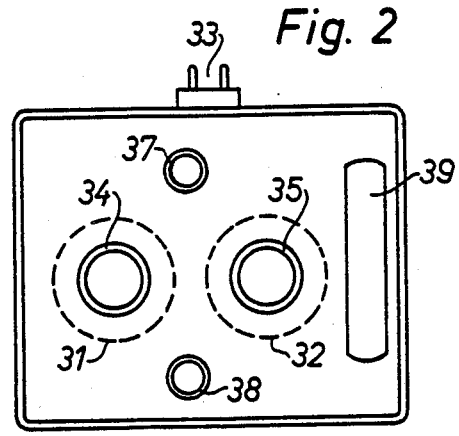
Figure 3:
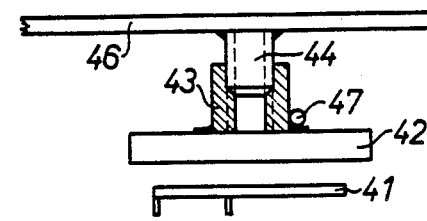
Figure 4:
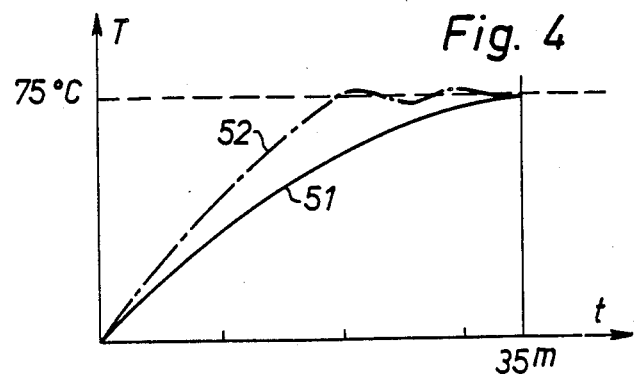
Figure 5:
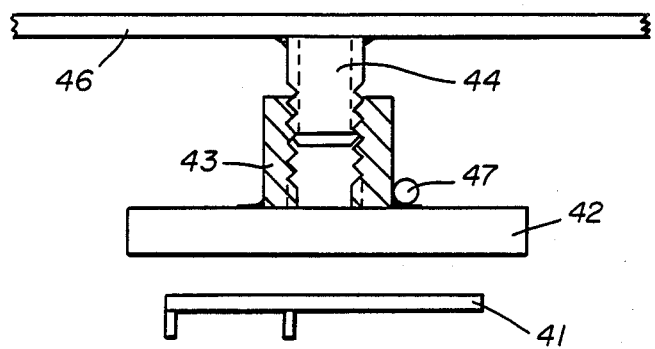

FIG. 1 shows a front view of a modified refrigerator which is part of the apparatus according to the invention, FIG. 2 shows a plan view of a tray which is intended for holding food and drinks and likewise forms part of the apparatus according to the invention, FIG. 3 shows a schematic representation of an embodiment of the temperature monitoring means FIG. 4 is a graph showing the increase in the temperature in the refrigerator with time during reheating when the refrigerator contains different numbers of trays and the trays are filled to different extents with tableware and FIG. 5 shows a schematic representation of a second embodiment of the temperature monitoring means.

FIG. 1 shows the front view of a modified refrigerator, whose door is not shown, for the sake of simplicity. A first switch 11, with which a cooling unit 13 installed behind the rear wall 12 can be switched on and off or the cooling temperature can be adjusted, is fastened on one side on the upper front panel 10 of this refrigerator. The switch is assigned an indicator lamp 14, which indicates the operating state of the cooling unit. A further switch 16, with which a generator 17 which generates inductively transmittable electrical energy can be switched on and off, is fastened on the other side of the upper front panel. This switch too is assigned an indicator lamp 18 which indicates whether the generator is switched on. A temperature monitoring means 19, which will be described in detail below with reference to FIG. 3, is installed behind the upper front panel.

Several pairs of mounting rails 23, 23'; 24, 24'; 25, 25'; 26, 26' which are intended for insertion of trays 27, 28, 29 are fastened to the side walls 21, 22 of the refrigerator.

FIG. 2 shows a tray which is intended to be placed in the refrigerator and has two induction coils 31, 32 which are connected in parallel to a plug 33. The surface of the tray incorporates circular grooves 34, 35 which are concentric with respect to the induction coils and into which the downward-projecting edge of tableware components can be inserted in order to hold the latter in an optimum position relative to the induction coil. Further grooves 37, 38 are provided for vessels containing drinks or foods which are not to be heated. Finally, the tray also contains a trough 39 for the cutlery.

FIG. 3 shows a preferred embodiment of the temperature monitoring means. This means includes an induction coil 41, which has the same shape and the same inductance as the coils in the trays but is fixed in the refrigerator, and a metal element 42, the diameter of which is about the same as the diameter of the bottom surface of a plate. A sleeve 43 is welded onto that surface of the element which faces away from the coil. This sleeve has an inner thread which is screwed onto the outer thread of a bolt 44 as shown in FIG. 5 or a sliding fit or tight fit as shown in FIG. 3 . The bolt is welded to a supporting plate 46, which in turn is fastened to the frame of the refrigerator. The inner thread of the sleeve 43 and the outer thread of the bolt 44 correspond to a "fine" thread tolerance, so that their flanks lie sufficiently close together to permit good heat transmission. The fastening described for the element 42 allows heat conduction from the inductively heated element 42 to the plate 46 to be adjusted so that the temperature of the element during reheating of food approximately corresponds to the temperature of a full plate or is proportional to this temperature. In the transition region between the metal element and the sleeve, a resistance thermometer 47 is fastened, the said thermometer controlling the On and Off switch for the generator 17 via an amplifier (not shown).

FIG. 4 is a graph showing the temperature, measured by the resistance thermometer, as a function of the time during heating of a different number of food portions, that is to say with different generator loads. The heating time t is plotted along the abscissa, and the temperature T along the ordinate. The curve 51 shows the temperature variation when the largest possible number of trays containing complete meals are placed in the cabinet, in other words when the generator is subjected to the maximum load. In this case, the solid food reaches a core temperature of 75° C. after 35 minutes. The curve 52 shows the temperature variation when the cabinet is only about half filled with trays, or the trays are only half filled, in other words the energy emitted by the energized induction coils is approximately doubled. In this case, the maximum admissible temperature is reached after as little as 20 minutes and then fluctuates about this temperature as a result of the generator switching on and off alternately, until the generator is switched off after the preset heating time (of 35 minutes) has expired. This temperature control ensures that, regardless of the cabinet content, every part of the meal is heated to the predetermined temperature without parts thereof being overheated or burned.

For an embodiment of the apparatus described which has been tested in practice, a refrigerator is used in which twelve trays could be placed, each tray containing a complete food portion. The trays were produced by the plastics injection moulding process, and each tray contained two integral induction coils having a maximum diameter of about 17 cm and an inductance of about 400 μHy. Several concentrically arranged, annular depressions which were of different diameters and were intended for insertion of the annular feet of tableware components in order to prevent slipping of the tableware components during serving, and an elongated trough for holding the cutlery were impressed in the upper surface of the tray. Two groups of annular depressions were arranged symmetrically with respect to the induction coils, so that the metal layer of the tableware placed therein was optimally aligned with respect to the associated induction coil. The position of the coils in the tray and the depth of the depressions were matched with the height of the foot of the tableware components in such a way that the distance between the coil in the tray and the metal layer on the lower surface of the base of the tableware component was about 5 to 8 mm.

When cooled food prepared so that it is ready to eat is reheated, care must be taken to ensure that, particularly the solid foods, in other words meat, vegetables, pasta or potatoes, are not burned on the outside and still cold in the interior, but are at a uniform eating temperature throughout and do not adhere to the edge of the plate. This state can only be achieved by slow heating at a relatively low temperature. In many experiments with various meals, it was found that a meal which had been heated for 35 minutes in a plate at about 75° C. was virtually impossible to distinguish from a freshly prepared meal.

In order to fulfill these heating conditions in a refrigerator and with trays of the type described above, a generator which generated inductively transmittable electrical energy at a frequency of 22 kHz and had an output power of 1.8 kW was installed in the refrigerator. The plates used for heating up solid food had a capacity (for liquid) of about 250 $cm_3$, and the diameter of the base area bordered by the annular foot was 17 cm. The metal layer of this base area consisted of twelve concentric rings which, starting from the outer edge, had a width of 2 mm and a spacing of 3 mm. The thickness of these rings was between 6 and 9 μm and preferably 7.5 μm.

For reheating a cooled soup, a soup bowl was used which had a capacity of about 250 $cm^3$ and the base surface of which had a diameter of 8.5 cm and the upper opening of which was larger than the base surface. In order to heat soup to eating temperature in the same time of 35 minutes, the base surface of the bowl was provided with a metal layer, which consisted of a central circular area of 30 mm diameter and 5 rings located concentrically around this and having a width of 2 mm and a spacing of 3 mm. The thickness of the metal layer was preferably 7.5 μm.

Coffee and tea water should be warmer than a meal or a soup. In order to heat the contents of a coffee jug which had a capacity of 250 $cm^3$ and a base surface of 8.5 cm diameter and an upper opening which is smaller than this base surface to 85° C. within 35 minutes, a "one-piece", circular metal layer whose thickness was again in the range from 6 to 9 μm and was preferably 7.5 μm was applied to the entire base surface.

Milk is particularly difficult to heat up. If it is intended to prevent coagulated milk, which is difficult to remove during washing up, from settling on the bottom, and to prevent a skin of milk from forming on the surface, the heating temperature should not exceed about 60° C. In order to achieve this, a vessel was used which had the same dimensions and the same shape as the coffee/tea water jug and whose metal layer on the base surface consisted of five concentric rings which, starting at the outer edge, had a width of 3 mm, a spacing of 2.5 mm and a thickness of about 8.5 μm.

The tableware described permits the various parts of a meal to be heated within 35 minutes to different temperatures corresponding to the content of the vessels, solid food reaches the desired core temperature, coffee water or tea water reaches the high temperature required for pouring, and milk reaches only a relatively low temperature at which coagulation and adhesion to the bottom of the vessel are reliably avoided.

The above-mentioned data are applicable if the refrigerator is charged with twelve laden trays, in other words if the output power of the generator is distributed over the 24 induction coils in the twelve trays and the fixed induction coil of the temperature monitoring means. Of course, if a refrigerator is charged with fewer trays or the trays are incompletely laden, in other words if fewer induction coils are able to transmit their energy to suitable receivers, the inserted tableware components inductively coupled to induction coils absorb more energy and are therefore heated up more rapidly or to a higher temperature than intended. In order to avoid the latter, the temperature monitoring means is installed, the metal element of the said means simulating the temperature of the base surface of a plate and the said means switching off the generator if the temperature exceeds the predetermined value before expiration of the set heating time, or switching on the generator if the temperature falls below this value again. The different metal layers on the base surfaces of the various tableware components result in different inductive couplings, and simulation of the temperature of the base surface of a plate is therefore sufficient to bring the content of each tableware component to the intended temperature during the predetermined time, regardless of the content of the refrigerator.

The apparatus described can be modified in a wide variety of ways and adapted to specific working conditions. For example, it is possible to use a refrigerator having a larger or smaller capacity, or trays having only one or more than two induction coils, if the output power of the generator is appropriately adapted. It is also possible to use tableware components having dimensions other than those described and appropriately adapted metal layers. In the temperature monitoring means, the sleeve shown by way of example for adjustable heat conduction and having the inner thread, and the bolt with the outer thread, can be replaced with a cylindrical sleeve and a cylindrical bolt whose internal and external diameter, respectively, have a sliding fit or tight fit. These and similar modifications are obvious to the skilled worker and will therefore not be discussed further.

What is claimed:

1. Apparatus for cooling, storing and reheating complete meals, which are prepared so that they are ready to eat, introduced in portions into appropriate tableware for eating and drinking and arranged on a tray, comprising a refrigerator which, in addition to a cooling unit for the refrigerator, is equipped with a generator for inductively transmittable electrical energy, and trays, each of which has at least one induction coil which is operatively coupled to the generator when the tray is placed in the refrigerator, and tableware components which have a metal layer at least on the outer surface of the base, the said metal layer being suitable for inductive heating by said induction coils, a temperature monitoring means (19), wherein the temperature monitoring means contains an induction (41) fixed in the refrigerator apart from said trays and a workpiece (42) adjacent to said induction coil (41) disposed for inductive heating thereby the heat capacity of said workpiece being virtually equivalent to that of a full plate of tableware and said workpiece having a temperature measuring means (47) mounted thereon for controlling a switch for the supply voltage to the generator (17), said temperature monitoring means switching the generator (17) off or on during the heating time responsive to the temperature measuring means (47) exceeding a predetermined temperature or falling below it thereby simulating the temperature of the tableware in the region of the metal layer.

2. Apparatus according to claim 1, characterized in that the workpiece (42) is fastened to the refrigerator by means of a device (43, 44, 46) having means for adjustable heat conduction.

3. Apparatus according to claim 1, characterized in that the workpiece is a metal disc (42) having a sleeve (43) which is arranged in the centre of the surface which faces away from the induction coil, which sleeve, in order to adjust the heat conduction, can be pushed to different extents onto a bolt (44) which is fastened to the refrigerator and made of material having good thermal conductivity.

4. Apparatus according to claim 1, characterized in that the workpiece is a metal disc (42) having a sleeve (43) which is arranged in the center of the surface which faces away from the induction coil, which sleeve, in order to adjust the heat conduction, can be screwed to different extents onto a bolt (44) which is fastened to the refrigerator and made of material having good thermal conductivity.

* * * * *